Nov. 18, 1930.                I. F. DAINS                1,781,947
                        POTTERY KICK-OUT ELEMENT
                          Filed Nov. 18, 1927
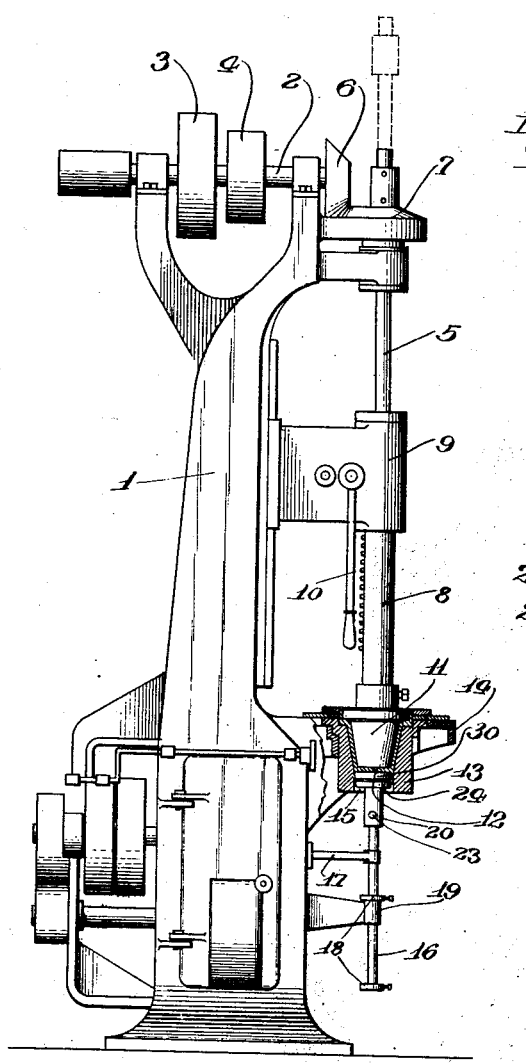
Inventor:
Irven F. Dains.
by Charles W. Hill
Attys.

Patented Nov. 18, 1930

1,781,947

UNITED STATES PATENT OFFICE

IRVEN F. DAINS, OF MONMOUTH, ILLINOIS, ASSIGNOR TO WESTERN STONEWARE COMPANY, OF MONMOUTH, ILLINOIS, A CORPORATION OF MAINE

POTTERY KICK-OUT ELEMENT

Application filed November 18, 1927. Serial No. 234,070.

Heretofore in the manufacture of pottery and the like in molding machines provided with a rotatable core and a stationary mold and non-rotatable kickout, it has been impossible to emboss or engrave characters on the bottom of the pottery due to the fact that the rotatable core during a molding operation very often causes the article being molded to have a slight rotatable movement relative to the mold and the kickout, so that any characters which might be formed on the article would be destroyed or mutilated, due to the fact that the kickout is non-rotatable.

To overcome the above difficulties this invention relates to pottery molding machines for making flower pots and the like, and more particularly to a kickout element having a rotatable head adapted to rotate with the plastic material being molded, said kickout head having the upper face thereof engraved or embossed with characters to form an embossing or imprinting die permitting names, characters or the like to be formed on the bottom of a flower pot or the like being molded in the machine without any danger of the characters being destroyed.

It is an object of this invention to provide a pottery molding machine of the rotary core and stationary mold type having a rotatable kickout die whereby characters or the like may be either embossed on or engraved in the bottom of articles molded in the machine.

It is also an object of this invention to provide a pottery molding machine with a kickout element having a rotatable die forming a part thereof, and permitting flower pots to be molded with embossed letters or characters on the bottom thereof to designate the name of the manufacturers, size of the flower pot and the like.

It is an important object of this invention to provide an improved kickout element for use in a pottery molding machine of the rotary core type, with said element having a ball bearing supported die head forming a part thereof and movable with the article being molded to facilitate either embossing characters and supporting ribs on the bottom of the articles or engraving said bottoms and forming outlet or drain passages therein.

Other and further important objects of this invention will become apparent from the following specification and the appended claims.

This invention (in a preferred form) is illustrated in the drawings and hereinafter more fully described.

On the drawings:

Figure 1 is a side elevation of a pottery molding machine with parts shown in sections, and having an improved kickout element embodying the principles of this invention.

Figure 2 is an enlarged top plan view of the kickout element removed from the machine.

Figure 3 is a longitudinal section of the kickout element taken on line III—III of Figure 2.

As shown on the drawings:

The reference numeral 1 indicates a standard pottery molding machine frame provided with a top shaft 2 and driving pulleys 3 and 4, whereby a reciprocating spinner or core-carrying shaft 5 is adapted to be rotated by beveled members 6 and 7. The spinner shaft 5 is provided with a rack sleeve 8 which is adapted to be raised or lowered through an adjustable bracket 9 by means of a control lever or handle 10 and a gear (not shown) which is located within the bracket 9 in co-acting relation with the rack sleeve 8. Attached to the lower end of the spinner shaft 5 below the rack sleeve 8 is a spinner or core 11, of substantially a frustrum shape and provided with one or more flanges at the enlarged upper end thereof. Formed axially on the lower reduced end of the core or spinner 11 is a punch pin or projection 12.

The reciprocating spinner 11 is adapted to be moved into or out of engagement with a stationary flask or mold 13 supported on a table or shelf 14, forming a part of the machine framework. The mold 13 has the interior thereof shaped complemental to the exterior of the spinner 11 to permit a flower pot of a predetermined shape to be molded in the machine. The lower end of the mold 13 is provided with an opening 15 for the reception of the kickout element. The kickout element comprises a kickout shaft or rod 16 which is slidably engaged in a bracket arm 17 mounted on the machine framework. Stop rings 18 are adjustably secured on the kickout shaft 16 to limit the movement thereof by means of a reciprocating arm 19 which projects outwardly through a slot in the base of the machine framework, and is adapted to be operated by any suitable means.

The improved kickout element is adapted to be removably secured on the upper threaded end of the kickout shaft 16, and as illustrated in Figures 2 and 3 comprises a cylindrical shank or sleeve 20 provided with an internally threaded passage 21 in the lower end thereof, while the upper end is provided with an enlarged internal passage 22 and with an outlet opening 23 in one side thereof, to permit discharge of plugs punched out of the bottom of flower pots which are molded in the machine.

The kickout shank 20 is provided with a slightly tapered head 24, the upper end of which is formed with a recess 25 in which a ball bearing race 26 is mounted carrying a plurality of bearing balls 27. The kickout head 24 is also provided with an upper projecting circular ridge or flange 28 positioned to the outside of the ball bearing mechanism. Rotatably projecting into the upper end of the kickout passage 22 is a hollow stem or tube 29, on the upper projecting end of which a tapered kickout die head 30 is rigidly secured. The under face of the die head 30 is concentrically grooved to interfit with the upper end of the lower kickout head 24, permitting the die head 30 to be rotatably supported on the bearing balls 27 so that the die head 30 and its sleeve 29 are rotatably supported upon the kickout head 24. The top face of the die head 30 is provided with a circular groove 31 and with a plurality of spaced radially directed grooves or recesses 32. The circular groove 31 forms a peripheral ridge or bead 33 on the die head with said bead 33 being interrupted at spaced intervals by the radial recesses or grooves 32. The space between the circular groove 31 and the inner periphery of the die head 30 is adapted to be engraved or cut with a series of letters, numbers or characters so that the same will form the name of a company, in addition to numerals or the like, for designating the size of flower pots which are being formed. If desired the groove space 31 may be provided with embossed or engraved characters so that characters may be formed in the bottom rim of the article being molded.

By the use of the improved rotatable die head it will, of course, be readily understood that embossed letters or characters may be readily formed on the bottom of a flower pot or the like during a molding operation, and that radial supporting ribs or feet may also be formed on the base of a container being molded, due to the provision of the radial grooves or recesses 32 formed in the die head. The formation of supporting ribs on the bottom of the container permits proper drainage to take place. The rotatable feature of the die head permits letters or the like to be embossed on the base of a flower pot being molded without any distortion of the characters, since any rotatable movement imparted to the article being formed by the rotatable core will be likewise imparted to the rotatable kickout die head, thereby obviating any damage being done to the characters formed on the bottom of the article being molded. This arrangement is entirely new in the art and affords a convenient means whereby the names and addresses of the manufacturers or distributors may be embossed on or engraved in pottery as well as the particular size of the pots or containers which are molded in the pottery molding machine.

The improved kickout element as shown in Figure 1 is adapted to be positioned in the opening 15 in the lower end of the mold 13 to support a quantity of molding clay within the mold prior to the lowering of the rotatable forming core 11. With the lowering of the rotatable core 11 into the mold 13 the molding clay is molded into the desired shape and the clay is pressed into engagement with the engraved face of the rotatable kickout head 30 to form the desired letters or characters on the bottom of the pot or container which is being molded. Any rotation of the pot while being formed which might be caused by the rotation of the rotating core 11 is transmitted to the rotatable kickout head 30, which consequently is also permitted to rotate so that there will be no relative movement between the kickout head 30 and the rotating core. The letters or characters which are embossed upon the bottom of the pot being formed will therefore not be distorted or injured during the molding process. At the time that the rotating core 11 is lowered to cause the shaping of a flower pot within the mold 13 the punch pin 12 will punch out a plug from the middle of the base of the flower pot, leaving a hole in the middle central portion of the flower pot when the core is withdrawn and the finished pot is removed from the mold. The punched out plug is permitted to drop through the passage provided in the tube 29 of the kickout head into the bottom of the passage 22, from which the plug may be discharged through the opening 23.

After a flower pot has been completely molded as hereinbefore described, the rotating core 11 is retracted from its engagement within the formed pot, after which the reciprocating bracket 19 is operated to cause the kickout element to be projected upwardly in the mold 13 to cause the formed flower pot to be projected upwardly out of the mold into a position from which it may be readily removed from the molding machine.

With the improved kickout element of this invention provided with a rotatable engraved head, flower pots and similar pottery formed in molding machines may have the names of manufacturers embossed on the bottom thereof, as well as numerals or characters indicating the particular size of the pot. Attention is also called to the fact that the improved rotatable kickout head furthermore permits radial ribs or the like to be integrally embossed or formed on the bottom of a flower pot or the like to permit the bottom of the flower pot to be slightly spaced from the table or floor on which it is standing to provide an air or drain space beneath the flower pot.

The rotatable kickout die head 30 may be provided with radial ribs in place of the radial grooves 32, in which case radial outlet or drain grooves will be formed in the bottom rims of molded pottery instead of the radial ribs or feet. The bottoms of the articles being molded may therefore have characters embossed thereon or engraved or stamped therein as desired, depending upon whether the rotatable kickout die head is engraved or embossed.

The improved rotatable kickout device not only permits pottery to be molded and simultaneously embossed or engraved with characters, but furthermore affords an arrangement of parts whereby the pottery may be perfectly molded without any scraped or strained sections which usually results in the old type of machines from relative twisting movement between the material being molded and the stationary kickout element and mold.

I am aware that numerous details in the above specification may be varied through a wide range without departing from the principles of this invention, and I therefore do not purpose limiting the patent granted hereon, otherwise than necessitated by the prior art.

I claim as my invention:

1. The combination with a pottery molding machine mold, of a rotatable core adapted to be projected therein, a kickout member positioned to be projected into said mold, and a rotatable head supported on said kickout member for co-action with said rotatable core to mold a material in said mold.

2. The combination with a pottery molding machine mold, of a rotatable core therein, and means rotatable with the material being molded to emboss characters on the article being formed.

3. In a pottery molding machine, the combination with a mold, of an engraved rotatable kickout element adjustably mounted in said mold, and a rotatable core in said mold above said kickout element to cause embossed characters to be integrally formed on the bottom of an article molded in said mold.

4. In a pottery molding machine, the combination with a mold, of a reciprocating rotatable core for co-action therewith to form a container out of molding clay, a kickout shaft, means for adjustably supporting the same, a kickout base member supported on said shaft and projecting into said mold, and an engraved kickout head rotatably mounted on said kickout base member for co-action with said core to cause embossed characters to be formed on an article being molded in the machine.

5. The combination with a pottery mold and the rotatable forming core thereof, of an engraved rotatable kickout mechanism within said mold in co-acting relation with said core to permit embossed characters to be formed on an article which is molded between said mold and core.

6. The combination with a pottery mold and core, of an engraved rotatable kickout element adjustably engaged in said mold for co-action with said core to cause embossed characters to be formed on an article molded between said mold and core.

7. The combination with a pottery molding machine, of an engraved rotatable kickout element adjustably mounted thereon to permit the machine to form characters on an article being molded therein.

8. The combination with a pottery molding machine mold and spinner core, of a passaged kickout base element supported beneath said mold, and an engraved die member rotatably supported on said kickout base element for co-action with said spinner core.

9. The combination with a pottery molding machine mold and spinner core, of a kickout shaft positioned therebeneath, a passaged kickout base element supported on said shaft, a ball bearing on said kickout base element, and an engraved die head interfitting with said kickout base element and rotatably supported on said ball bearing.

10. A pottery molding machine kickout element comprising a passaged base element, a ball bearing unit seated therein, an engraved kickout head rotatably supported on said ball bearing above said base element, and a tubular stem rigidly secured to said engraved kickout head and projecting into said kickout base element.

11. A pottery molding machine kickout element comprising a passaged base section having a groove in the top thereof, a ball bearing mounted in said groove, a hollow stem rotatably projecting through said ball bearing and into said passaged base section, and an engraved head secured on said passaged stem and rotatably supported on said ball bearing.

12. A pottery molding machine kickout mechanism comprising a base section, an engraved head section interfitting the same, and bearing means positioned between said base section and said engraved head section to permit relative movement to take place between said base section and said head section.

13. A pottery molding machine kickout mechanism comprising a passaged base section, a sleeve rotatably mounted therein, bearing means supported on said base section around said sleeve, and an engraved die secured on said sleeve in contact with said bearing means.

14. A pottery molding machine kickout mechanism comprising a passaged shank, a grooved head integrally formed thereon, bearing means supported in said head, a sleeve rotatably projecting through said bearing means and into said shank, and an embossing die secured on said sleeve and rotatably supported on said bearing means.

15. A pottery molding machine kickout mechanism comprising a stationary base member, an embossing die rotatably interfitting the same, and bearing means positioned between said base member and said embossing means.

16. A pottery molding machine kickout mechanism comprising a base section, and a die head rotatably interfitting the same.

17. A pottery molding machine kickout mechanism comprising a passaged base section, and a passaged and engraved die member rotatably interfitting the same.

18. The combination with means for rotating and shaping a material to form an article, of means rotatable with the material to form characters on said article.

19. In a machine for moulding plastic material, a plurality of relatively rotatable die members, one of said members being engraved and adapted for rotation through the friction engendered by said plastic material.

20. In a moulding machine for plastic material, a rotatable male die member and a female die member cooperating therewith, said female die member including a member rotatable with the material for embossing the article being formed.

21. The combination with male and female die members for forming plastic material into an article, of means associated with one of said die members adapted to be moved in the same direction therewith by the material and mold characters on the material.

22. In a moulding machine for plastic material, a moulding die adapted to be rotated while forming the material into an article, and a rotatable opposed die member rotatable by the material and adapted to form characters on the article.

23. In a moulding machine for forming plastic material, a male die and a female die, one of which rotates with respect to the other, and means associated with one of said dies adapted to move in unison with its opposed die to form characters on the material being moulded.

24. A pottery forming machine comprising a male die and a female die and a rotatable member coacting with one of said dies to mold characters on a surface of a piece of pottery being formed in the machine.

In testimony whereof I have hereunto subscribed my name.

IRVEN F. DAINS.